US012688230B2

(12) United States Patent
Moon et al.

(10) Patent No.: US 12,688,230 B2
(45) Date of Patent: Jul. 21, 2026

(54) SYSTEM AND METHOD FOR DETECTING VIDEO SEMANTIC INTERVAL

(71) Applicant: ELECTRONICS AND TELECOMMUNICATIONS RESEARCH INSTITUTE, Daejeon (KR)

(72) Inventors: Jin Young Moon, Daejeon (KR); Jonghee Kim, Daejeon (KR); Muah Seol, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 352 days.

(21) Appl. No.: 18/519,415

(22) Filed: Nov. 27, 2023

(65) Prior Publication Data

US 2025/0086227 A1 Mar. 13, 2025

(30) Foreign Application Priority Data

Sep. 13, 2023 (KR) ........................ 10-2023-0121710

(51) Int. Cl.
| | |
|---|---|
| *G06F 16/732* | (2019.01) |
| *G06V 10/82* | (2022.01) |
| *G06V 20/40* | (2022.01) |

(52) U.S. Cl.
CPC .......... *G06F 16/7328* (2019.01); *G06V 10/82* (2022.01); *G06V 20/41* (2022.01)

(58) Field of Classification Search
CPC ..... G06F 16/7328; G06F 16/73; G06V 10/82; G06V 20/41
See application file for complete search history.

(56) References Cited

U.S. PATENT DOCUMENTS

| | | | |
|---|---|---|---|
| 9,535,990 B2 * | 1/2017 | Skolicki .............. | G06F 16/7844 |
| 10,839,223 B1 * | 11/2020 | Jiang ........................ | G06T 7/20 |

(Continued)

FOREIGN PATENT DOCUMENTS

| | | |
|---|---|---|
| KR | 101903720 B1 | 10/2018 |
| KR | 1020210075924 A | 6/2021 |

(Continued)

OTHER PUBLICATIONS

Songyang Zhang, et al., "Learning 2D Temporal Adjacent Networks for Moment Localization with Natural Language", arXiv:1912.03590, The Thirty-Fourth AAAI Conference on Artificial Intelligence (AAAI-20), Apr. 3, 2020, pp. 12870-12877.

*Primary Examiner* — Shaghayegh Azima
(74) *Attorney, Agent, or Firm* — Rabin & Berdo, P.C.

(57) ABSTRACT

Provided is a system for detecting a video semantic interval. The system includes a communication module configured to receive a video and a query sentence, memory in which a program for outputting a semantic interval proposal from the video and the query sentence is stored, and a processor configured to execute the program stored in the memory. By executing the program, the processor outputs a semantic interval proposal having start timing and end timing, which is matched with the query sentence within the video, over a pre-trained video semantic interval detection network based on boundary refinements as the results of the detection of the semantic interval proposal, and outputs a semantic interval proposal having a variable boundary through the refinements of a predetermined semantic interval proposal.

15 Claims, 16 Drawing Sheets

(56)             References Cited

U.S. PATENT DOCUMENTS

| | | | | |
|---|---|---|---|---|
| 11,687,588 | B2 * | 6/2023 | Gao | G06F 40/47 |
| | | | | 704/2 |
| 2012/0269429 | A1 * | 10/2012 | Lee | G06V 10/56 |
| | | | | 382/165 |
| 2017/0238055 | A1 * | 8/2017 | Chang | G06V 20/42 |
| | | | | 725/19 |
| 2018/0210890 | A1 * | 7/2018 | Son | G06F 16/738 |
| 2021/0256059 | A1 * | 8/2021 | Gan | G06V 20/46 |
| 2021/0349940 | A1 * | 11/2021 | Chen | G06V 10/82 |
| 2022/0019834 | A1 * | 1/2022 | Taskalian | G06F 16/538 |
| 2022/0261550 | A1 * | 8/2022 | Moon | G06F 40/30 |

FOREIGN PATENT DOCUMENTS

| | | |
|---|---|---|
| KR | 1020220013164 A | 2/2022 |
| KR | 1020220116713 A | 8/2022 |

* cited by examiner

PROPOSAL FEATURE MAP(21)

N x N x d

PROPOSAL SCORE MAP(22)

N x N

PROPOSAL FEATURE MAP(31)

N x N x d

PREDICT PROPOSAL SCORE

PROPOSAL SCORE MAP(32)

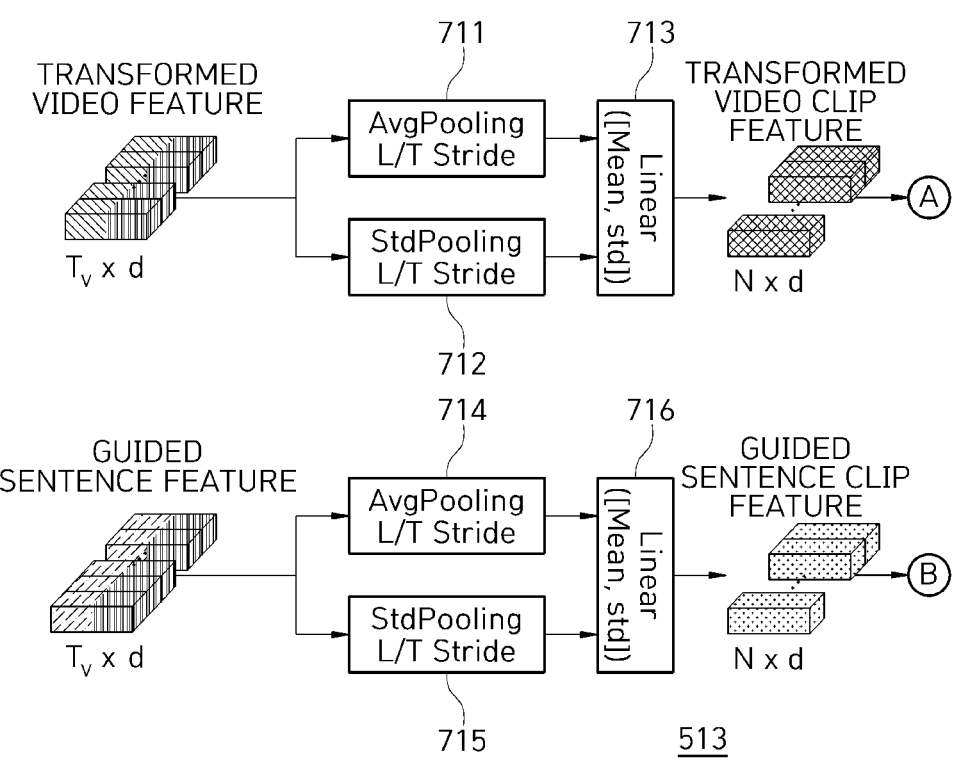

TRANSFORMED
VIDEO FEATURE

711

AvgPooling
L/T Stride

713

Linear
([Mean, std])

TRANSFORMED
VIDEO CLIP
FEATURE $T_v$ x d

StdPooling
L/T Stride

Ⓐ

N x d

712

GUIDED
SENTENCE FEATURE

714

AvgPooling
L/T Stride

716

Linear
([Mean, std])

GUIDED
SENTENCE CLIP
FEATURE $T_v$ x d

StdPooling
L/T Stride

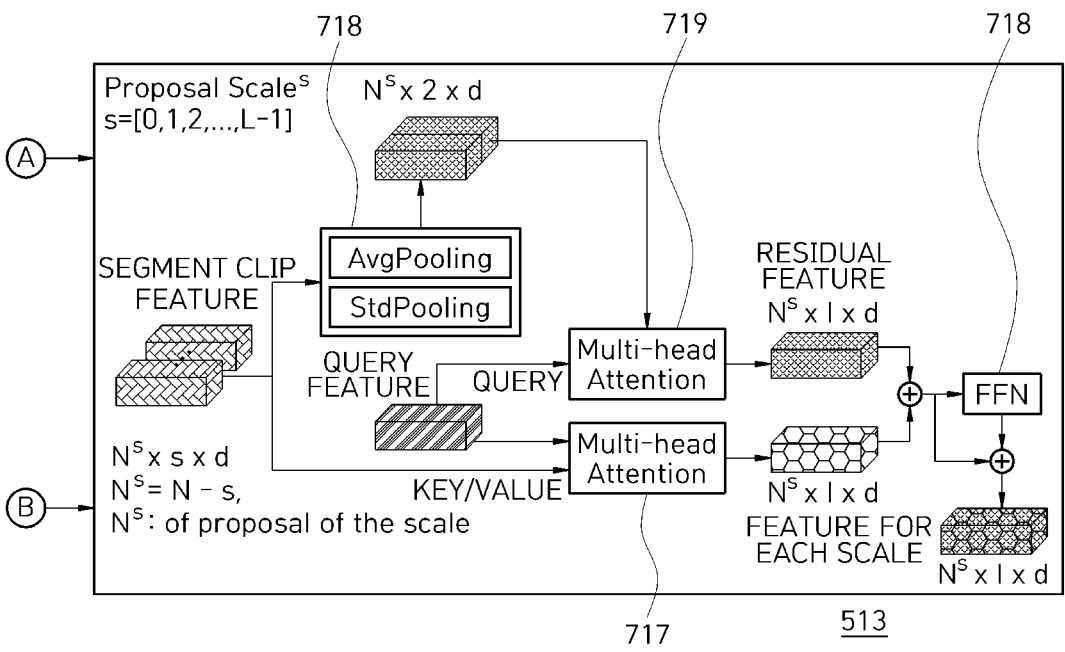

718

Proposal Scale$^s$
s=[0,1,2,...,L-1]

$N^s$ x 2 x d

719

718

Ⓐ

AvgPooling
StdPooling

SEGMENT CLIP
FEATURE

QUERY
FEATURE

QUERY

Multi-head
Attention

RESIDUAL
FEATURE
$N^s$ x l x d

FFN $N^s$ x s x d
$N^s$ = N - s,
$N^s$: of proposal of the scale

KEY/VALUE

Multi-head
Attention $N^s$ x l x d

FEATURE FOR
EACH SCALE
$N^s$ x l x d

$S_I$ : PROPOSAL INTERVAL LENGTH

L

910

$t_s$ $C_d$

PROPOSAL
LENGTH

Sentence Query: a person opens a refrigerator.

| | | |
|---|---|---|
| GT | 0.0s ... 4.2s | 36.7s |
| 2D-TAN | 0.0s ... 11.4s | 36.7s |
| Our(Non-Refined) | 0.0s ... 6.9s | 36.7s |
| Our(Refined) | 0.0s ... 4.9s | 36.7s |

Sentence Query: She jumps and flips herself around and ends by jumping down with her arms up.

| | | |
|---|---|---|
| GT | 0.0s ... 66.5s | 104.4s |
| 2D-TAN | 0.0s ... 58.3s | 109.9s |
| Our(Non-Refined) | 0.0s ... 72.1s | 109.9s |
| Our(Refined) | 0.0s ... 69.2s | 106.0s |

SYSTEM AND METHOD FOR DETECTING VIDEO SEMANTIC INTERVAL

CROSS-REFERENCE TO RELATED APPLICATION

This application claims priority to and the benefit of Korean Patent Application No. 10-2023-0121710, filed on Sep. 13, 2023, the disclosure of which is incorporated herein by reference in its entirety.

BACKGROUND

1. Technical Field

The present disclosure relates to a system and method for detecting a video semantic interval and to system and method for detecting a video semantic interval, which can output a semantic interval proposal having a variable boundary through interval refinements.

2. Related Art

FIG. 1 is a diagram for describing the concept of the detection of a video semantic interval.

As illustrated in FIG. 1, the detection of a video semantic interval is a task (12) for querying a temporal interval having start timing and end timing, which is most matched with a query sentence, in a video by using, as an input, a given unedited video 10 and a query sentence 11 that is freely described in a natural language.

For the task, in proposal-based methods, among conventional technologies, a plurality of semantic interval proposals is generated without information on a boundary, that is, the start and end of a semantic interval. Thereafter, a feature for each proposal, that is, an interval proposal, is generated. Reliability for each proposal is predicted by using the proposal feature as an input. K semantic interval proposals, which have high K reliabilities and have K proposals overlapped in a predetermined range or less, are returned as the results of the detection of the video semantic interval.

FIGS. 2A and 2B are diagrams illustrating a proposal feature map 21 and a proposal score map 22 each having a two-dimensional map form in a conventional technology.

In a conventional technology, in order to increase the accuracy of the prediction of semantic interval reliability in the limited number of proposals, the proposal feature map 21 and the proposal score map 22 each having a two-dimensional map form are generated through the learning of multiple proposals together. In FIG. 2, a row indicates the start timing of an interval, and a column indicates the end of the interval. In the timing conventional technology, only an upper half in the two-dimensional map is actually used as proposals. In each map, a cell at positions (m, n) indicates one semantic interval proposal that is represented by Equation 1. In this case, $\tau$ indicates the unit length of the interval proposal. A total number of semantic intervals are determined by the unit length and a video segmentation number N. In this case, a total video length is $\tau \cdot N$.

$$[m \cdot \tau, (n+1) \cdot \tau], 0 \le m \le n \le N-1 \qquad (1)$$

The size of the two-dimensional map is determined by the size of available GPU memory and the length of a video that is used for learning. In this case, if the size N of the map is increased, a fine-grained semantic interval proposal may be generated because the unit length t is reduced. However, there is a problem in that high-capacity memory for such maps is required.

SUMMARY

Various embodiments are directed to providing a system and method for detecting a video semantic interval, wherein a temporal moment at a specific moment is queried within a video based on a deep learning-based machine learning algorithm.

In particular, an embodiment of the present disclosure may provide a system and method for detecting a video semantic interval, which receive a given unedited video and a query sentence that is freely described, accurately search a video for a temporal interval having start timing and end timing, which is most matched with a query sentence, through the understanding of the contents of the unedited video and the query sentence, but can output a semantic interval proposal having a boundary varied through interval refinements in the existing fixing boundary.

However, objects of the present disclosure to be achieved are not limited to the aforementioned object, and other objects may be present.

A system for detecting a video semantic interval according to a first aspect of the present disclosure includes a communication module configured to receive a video and a query sentence, memory in which a program for outputting a semantic interval proposal from the video and the query sentence is stored, and a processor configured to execute the program stored in the memory. In this case, by executing the program, the processor outputs a semantic interval proposal having start timing and end timing, which is matched with the query sentence within the video, over a pre-trained video semantic interval detection network based on boundary refinements as the results of the detection of the semantic interval proposal, and outputs a semantic interval proposal having a variable boundary through the refinements of a predetermined semantic interval proposal.

Furthermore, a method of detecting a video semantic interval according to a second aspect of the present disclosure includes receiving a video and a query sentence, inputting the video and the query sentence to a pre-trained video semantic interval detection network based on boundary refinements, and outputting a semantic interval proposal having start timing and end timing, which is matched with the query sentence within the video, as the results of the detection of the semantic interval proposal. In this case, the outputting of the semantic interval proposal as the results of the detection includes outputting a semantic interval proposal having a variable boundary through the refinements of a predetermined semantic interval proposal.

A computer program according to another aspect of the present disclosure executes the method of detecting a video semantic interval in association with a computer, that is, hardware, and is stored in a computer-readable recording medium.

Other details of the present disclosure are included in the detailed description and the drawings.

According to the embodiments of the present disclosure, a meaningful interval having a variable boundary can be extracted by using the interval refinement technology. Accordingly, accurate results can be provided through the understanding of contents of an unedited video and a free query sentence by searching for accurate start timing and end timing based on the unedited video and the query sentence.

Effects of the present disclosure which may be obtained in the present disclosure are not limited to the aforementioned effects, and other effects not described above may be evidently understood by a person having ordinary knowledge in the art to which the present disclosure pertains from the following description.

BRIEF DESCRIPTION OF THE DRAWINGS

FIG. 6 is a diagram for describing a unimodal feature encoding unit and a multimodal feature encoding unit in an embodiment of the present disclosure.

FIGS. 7A to 7C are diagrams for describing a cross-modal proposal feature map extraction unit in an embodiment of the present disclosure.

FIG. 8 is a diagram for describing a process of predicting the length of a query sentence in an embodiment of the present disclosure.

FIG. 14 is a diagram for describing qualitative analysis results of the method of detecting a video semantic interval based on boundary refinements.

DETAILED DESCRIPTION

Figure 1:
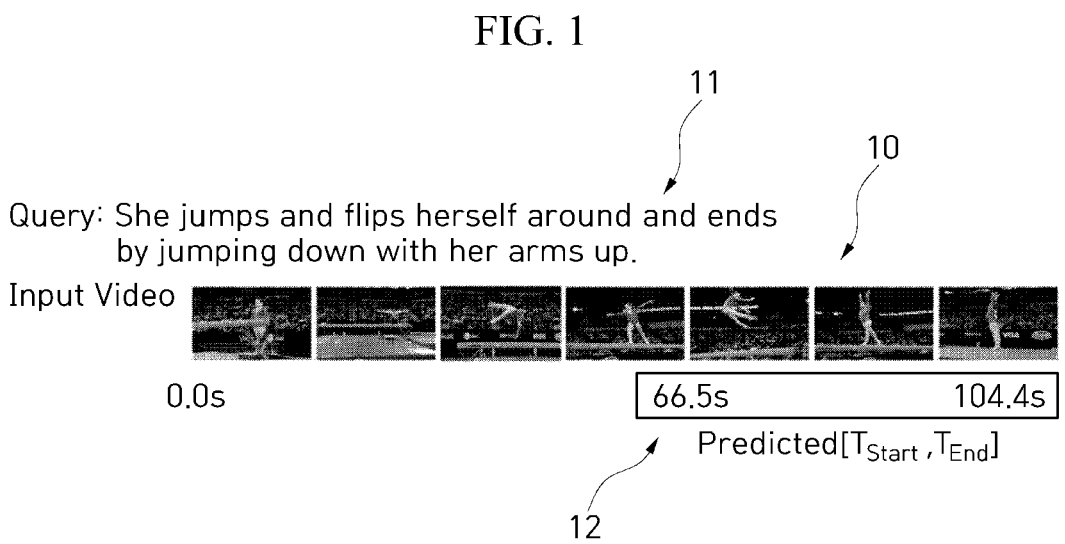
FIG. 1 is a diagram for describing the concept of the detection of a video semantic interval.
Figure 2A:
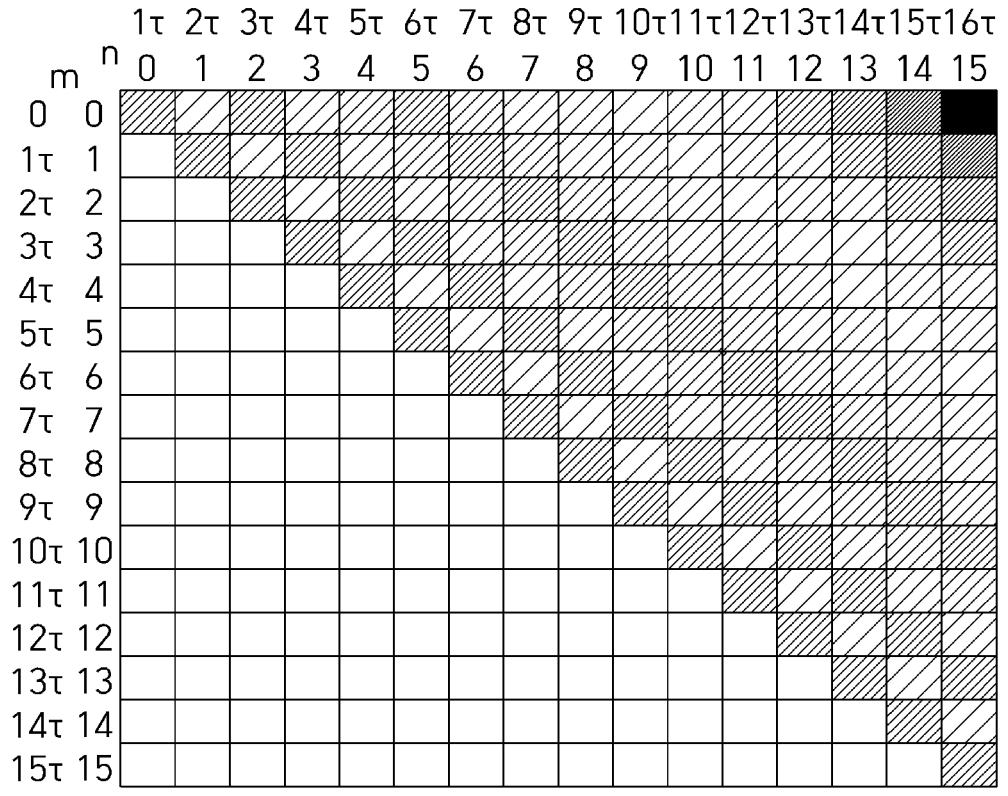
FIGS. 2A and 2B are diagrams illustrating a proposal feature map and a proposal score map each having a two-dimensional map form in a conventional technology.
Figure 2B:
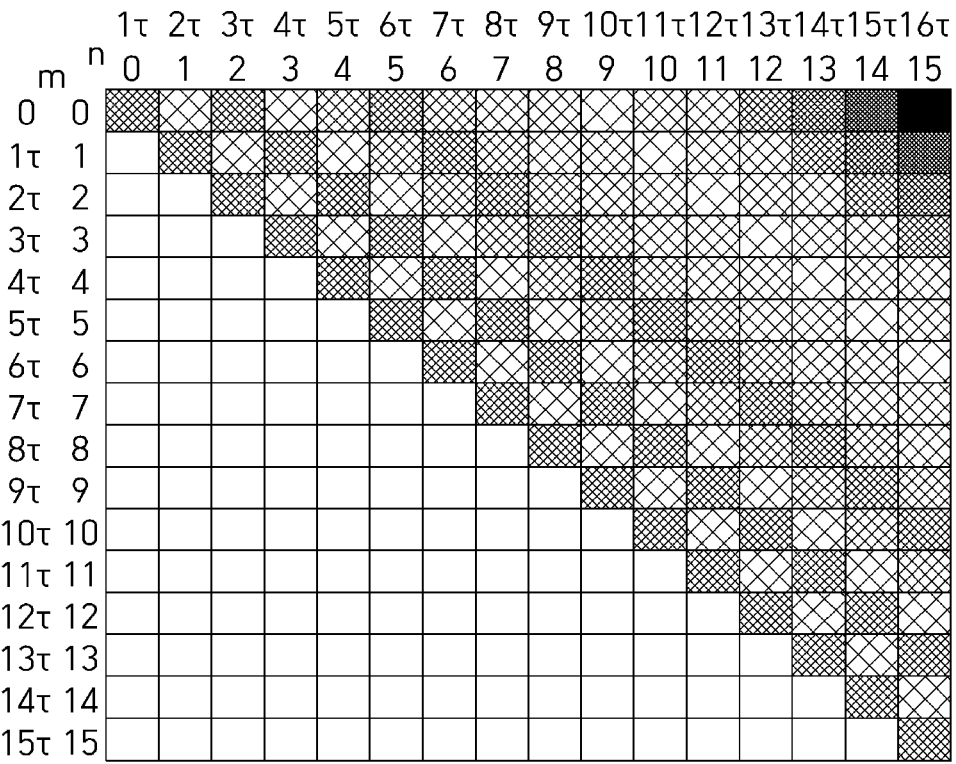

Advantages and characteristics of the present disclosure and a method for achieving the advantages and characteristics will become apparent from the embodiments described in detail later in conjunction with the accompanying drawings. However, the present disclosure is not limited to embodiments disclosed hereinafter, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Embodiments of the present disclosure relate to a system and method for detecting a video semantic interval.

An embodiment of the present disclosure proposes a semantic interval proposal having a variable boundary through proposal refinements, in order to overcome the limits of technologies for detecting a video semantic interval based on a two-dimensional proposal, which output a semantic interval proposal having a fixed boundary.

Furthermore, an embodiment of the present disclosure can autonomously output the results of the detection of a video semantic interval, and can improve the accuracy of the detection of a video semantic interval by being additionally applied to a system and method for detecting a video semantic interval using a two-dimensional map, which are different only in a refinement method from a conventional system and method for detecting a video semantic interval.

In particular, a semantic interval is detected in an unedited video, such as Vlog or a movie having a running time of 1 hour or more. It is practically impossible to use a two-dimensional map that is sufficiently large in the size of available GPU memory. For this reason, in order to improve the accuracy of the results of the detection of a video semantic interval with respect to a video having a long length, it is necessary to output a semantic interval proposal having a variable boundary through the refinements of a semantic interval.

The semantic interval proposal means a specific time range in a video. The semantic interval proposal means a small interval of a video that is segmented into a plurality of intervals. Each interval may indicate a specific time zone of the video. Such a proposal interval is used to indicate a temporal part in which a specific incident, movement, or object occurs in a video. Furthermore, the proposal interval is also used in tasks, such as video search, classification, and detection. The proposal interval is used to identify what contents each interval contains, and may be used to provide important information within a video.

Figure 3A:
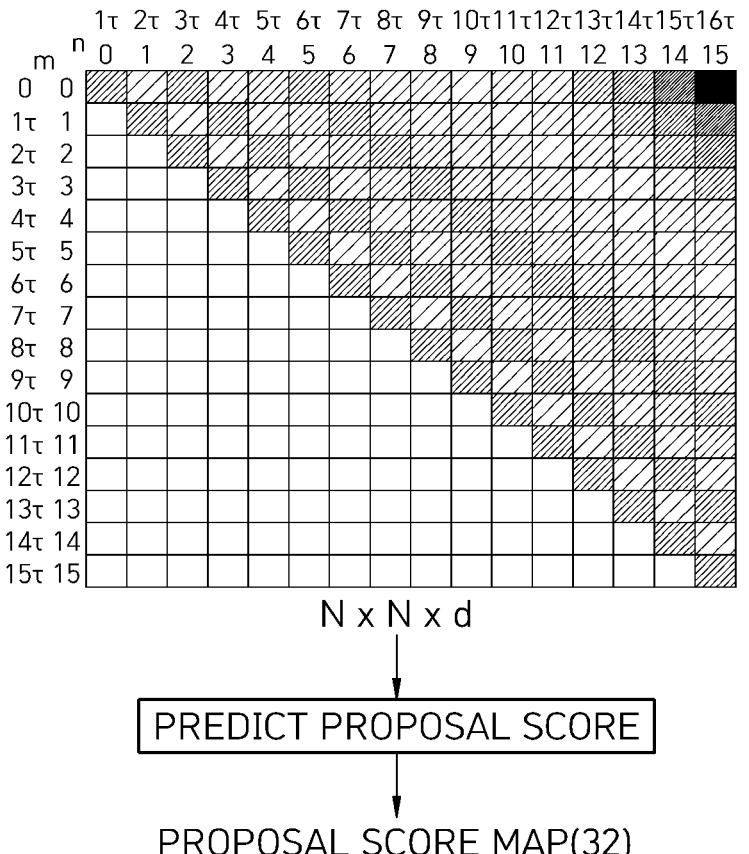
FIGS. 3A and 3B are diagrams for schematically describing a difference between an embodiment of the present disclosure and a conventional technology.
Figure 3A:
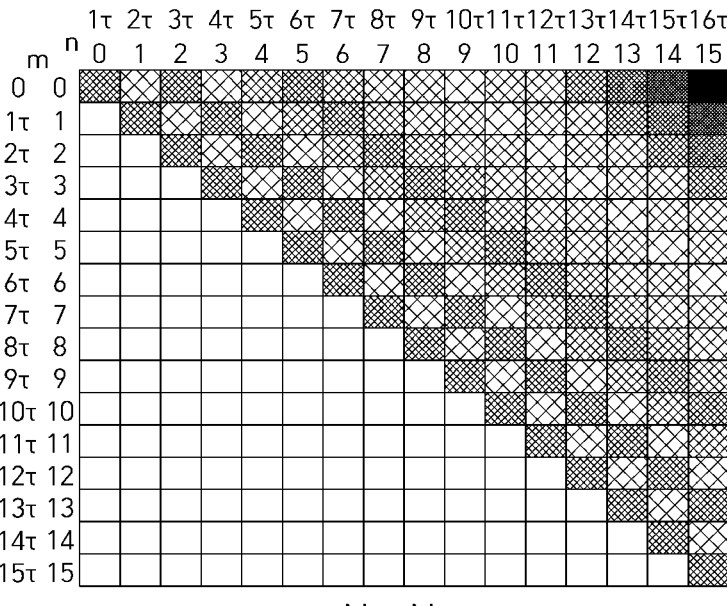
Figure 3B:
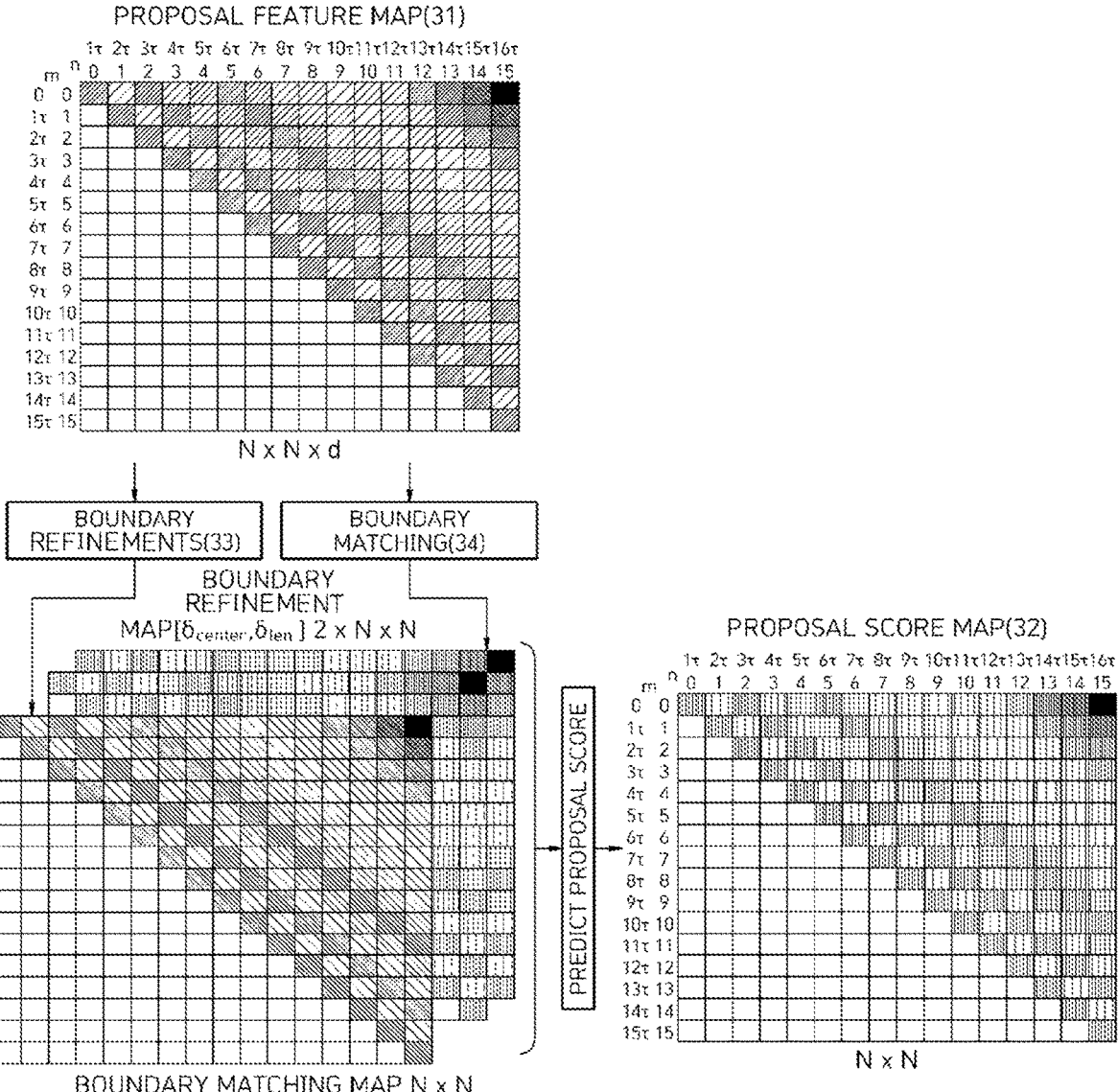

FIGS. 3A and 3B are diagrams for schematically describing a difference between an embodiment of the present disclosure and a conventional technology.

Basically, an object of the present disclosure is to obtain a semantic interval proposal that is refined through Equation 2, based on a center offset and a length offset that are obtained by predicting semantic interval proposals each having a fixed boundary, which are obtained from two-dimensional maps 31 and 32, based on a proposal refinement map as in Equation 1.

$$\left[ m \cdot \tau + \delta_{center}^{(m,n)} - \frac{\delta_{len}^{(m,n)}}{2}, (n+1) \cdot \tau + \delta_{center}^{(m,n)} + \frac{\delta_{len}^{(m,n)}}{2} \right], 0 \le m \le n \le N-1 \quad (2)$$

In Equation 2, $$\delta_{center}^{(m,n)}$$

means the center offset predicted in an (m, n)-th semantic interval proposal, and $$\delta_{len}^{(m,n)}$$

means the length offset predicted in the (m, n)-th semantic interval proposal.

In order to overcome the limits of a proposal having a fixed boundary as in FIG. 3A, an embodiment of the present disclosure proposes and method for detecting a video semantic interval, which improve accuracy performance by generating a semantic interval proposal having a variable boundary through boundary matching 34 and boundary refinements 33 as illustrated in FIG. 3B.

Figure 4:
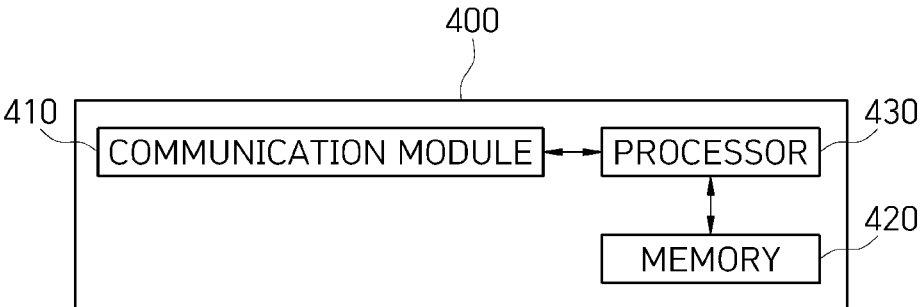
FIG. 4 is a block diagram of a system 400 for detecting a video semantic interval according to an embodiment of the present disclosure.

FIG. 4 is a block diagram of a system 400 for detecting a video semantic interval according to an embodiment of the present disclosure.

The system 400 for detecting a video semantic interval according to an embodiment of the present disclosure includes a communication module 410, memory 420, and a processor 430.

The communication module 410 receives a video and a query sentence. The communication module 410 may include both a wired communication unit and a wireless communication unit. The wired communication unit may be implemented as a power line communication device, a telephone line communication device, cable home (MoCA), Ethernet, IEEE1294, an integrated wired home network, or an RS-485 controller. Furthermore, the wireless communication unit may be constructed as a unit for implementing a function, such as a wireless LAN (WLAN), Bluetooth, an HDR WPAN, UWB, ZigBee, impulse radio, a 60 GHz WPAN, binary-CDMA, a wireless USB technology, a wireless HDMI technology, 5$^{th}$ generation (5G) communication, long term evolution-advanced (LTE-A), long term evolution (LTE), or wireless fidelity (Wi-Fi).

The memory 420 stores a program for outputting the semantic interval proposal from the video and the query sentence. In this case, the memory 420 commonly refers to a nonvolatile storage device that retains information stored therein although power is not supplied to the nonvolatile storage device and a volatile storage device. For example, the memory 120 may include NAND flash memory such as a compact flash (CF) card, a secure digital (SD) card, a memory stick, a solid-state drive (SSD), and a micro SD card, a magnetic computer memory device such as a hard disk drive (HDD), and an optical disc drive such as CD-ROM and DVD-ROM.

The processor 430 may control at least another component (e.g., a hardware or software component) of the system 400 for detecting a video semantic interval by executing software, such as a program, and may perform various data processing or operations.

By executing a program, the processor 430 outputs a semantic interval proposal having start timing and end timing, which is matched with a query sentence within a video, as the results of the detection of a video semantic interval over a pre-trained video semantic interval detection network based on boundary refinements. In this case, the processor 430 outputs a semantic interval proposal having a variable boundary through the refinements of a predetermined semantic interval proposal.

Figure 5:
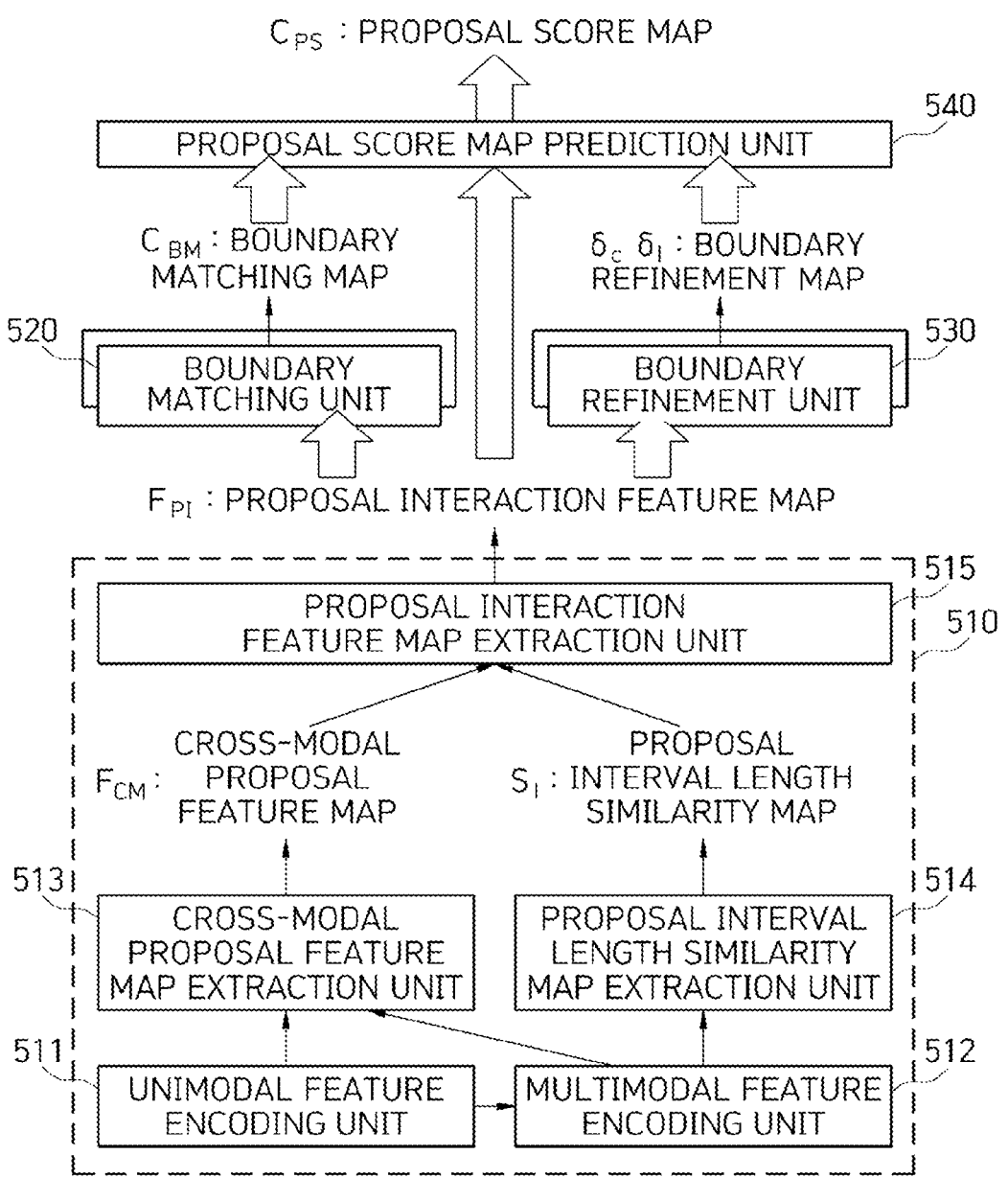
FIG. 5 is a diagram illustrating a functional block diagram of the system for detecting a video semantic interval according to an embodiment of the present disclosure.

FIG. 5 is a diagram illustrating a functional block diagram of a system 500 for detecting a video semantic interval according to an embodiment of the present disclosure.

The system 500 for detecting a video semantic interval according to an embodiment of the present disclosure includes a proposal feature extraction unit 510, a boundary matching unit 520, a boundary refinement unit 530, and a proposal score map prediction unit 540, which are operated by the processor 430.

The proposal feature extraction unit 510 includes a unimodal feature encoding unit 511, a multimodal feature encoding unit 512, a cross-modal proposal feature map extraction unit 513, a proposal interval length similarity map extraction unit 514, and a proposal interaction feature map extraction unit 515.

The unimodal feature encoding unit 511 extracts unimodal features from a received video and query sentence, respectively.

The multimodal feature encoding unit 512 extracts a multimodal feature in which the features of the received video and query sentence interact with each other. In this case, the interaction means that the video and the query sentence affect each other (or exchange data), and means that various intervals within a video affect a query sentence.

The cross-modal proposal feature map extraction unit 513 extracts a feature map of a semantic interval proposal based on a unimodal feature and a multimodal feature.

The proposal interval length similarity map extraction unit 514 extracts a proposal interval length similarity map based on a multimodal feature.

The proposal interaction feature map extraction unit 515 concatenates a feature map of the semantic interval proposal and a proposal interval length similarity map, and extracts a proposal interaction feature map $F_{PI}$ through an interaction between a plurality of semantic interval proposals.

The boundary matching unit 520 generates a candidate interval matching map $C_{BM}$ based on the proposal interaction feature map $F_{PI}$.

The boundary refinement unit 530 generates boundary refinement maps $\delta_C$ and $\delta_I$ indicative of a center offset and a length offset, respectively, for the fine adjustment of a semantic interval proposal that is predicted based on the proposal interaction feature map $F_{PI}$.

The proposal score map prediction unit 540 generates a final proposal score map based on the proposal interaction feature map $F_{PI}$, the candidate interval matching map $C_{BM}$, and the boundary refinement maps $\delta_C$ and $\delta_I$.

Thereafter, the processor 430 searches for K semantic interval proposals each having a high proposal score and not overlapping by a preset threshold interval or more, based on the final proposal score map. Furthermore, the processor 430 may output K semantic interval proposals that are most matched with a query sentence with respect to the retrieved K semantic interval proposals.

Hereinafter, the constructions of the functions described with reference to FIG. 5 are described specifically with reference to FIGS. 6 to 12.

Figure 6:
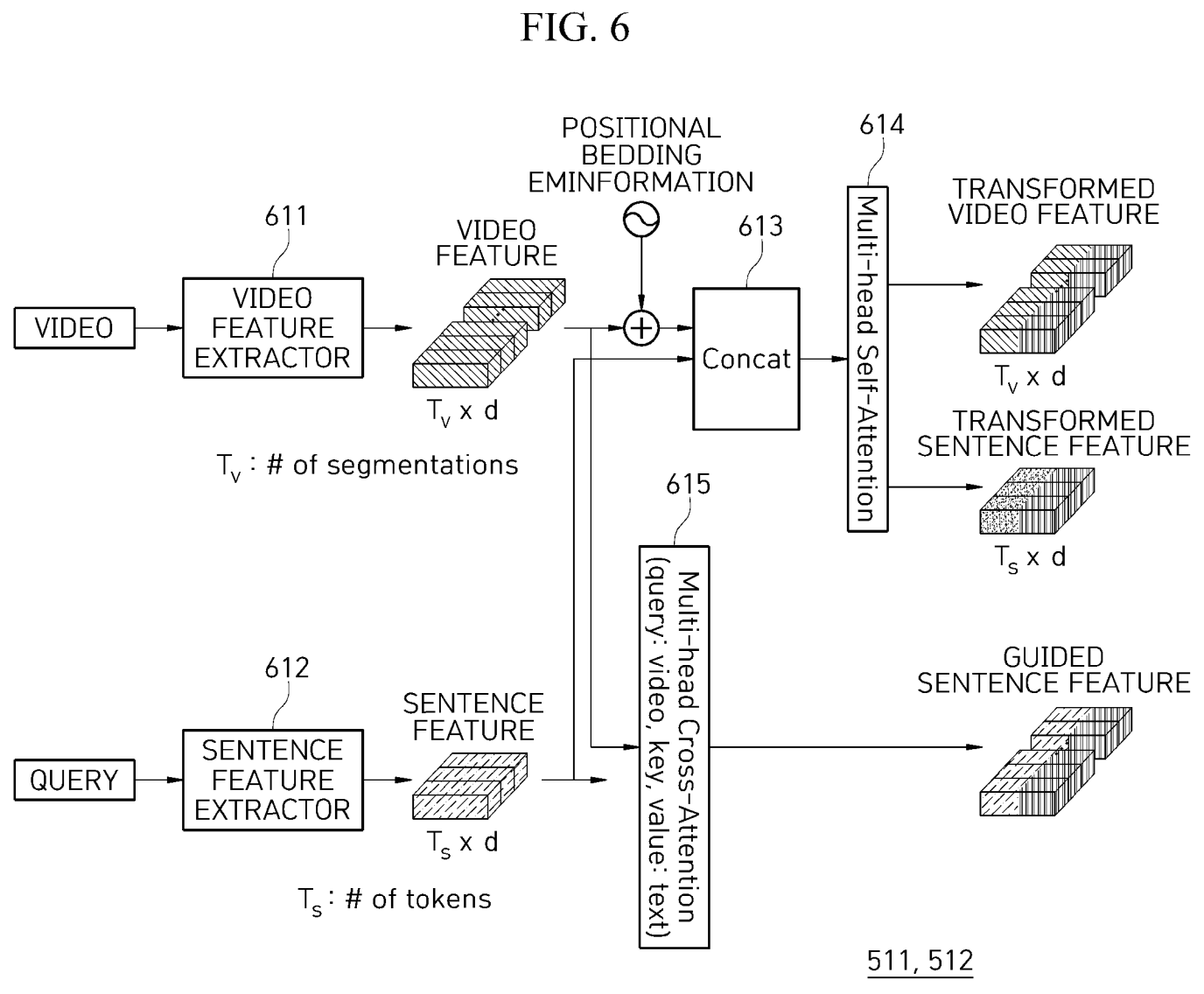

FIG. 6 is a diagram for describing the unimodal feature encoding unit 511 and the multimodal feature encoding unit 512 in an embodiment of the present disclosure.

As an embodiment, the unimodal feature encoding unit 511 may extract a video feature by inputting a video to a pre-trained video feature extractor 611, and may extract a sentence feature by inputting a query sentence to a pre-trained bidirectional encoder representations from transformer (BERT) model-based sentence feature extractor 612. That is, the video feature may be extracted through a CNN-series pre-trained video feature extractor 611. The sentence feature may be extracted through the pre-trained BERT model-based sentence feature extractor 612.

As an embodiment, the multimodal feature encoding unit 512 may generate a transformed video feature and a transformed sentence feature through a multi-head self-attention operation 614, by inserting position information by adding positional embedding information to the video feature and concatenating (613) the video feature and the sentence feature. Furthermore, the multimodal feature encoding unit 512 may set the video feature as a query, may set the sentence feature as a key and a value, and may generate a guided sentence feature as a video feature through a multi-head cross-attention operation 615 of the query and the key and value.

Figure 7C:
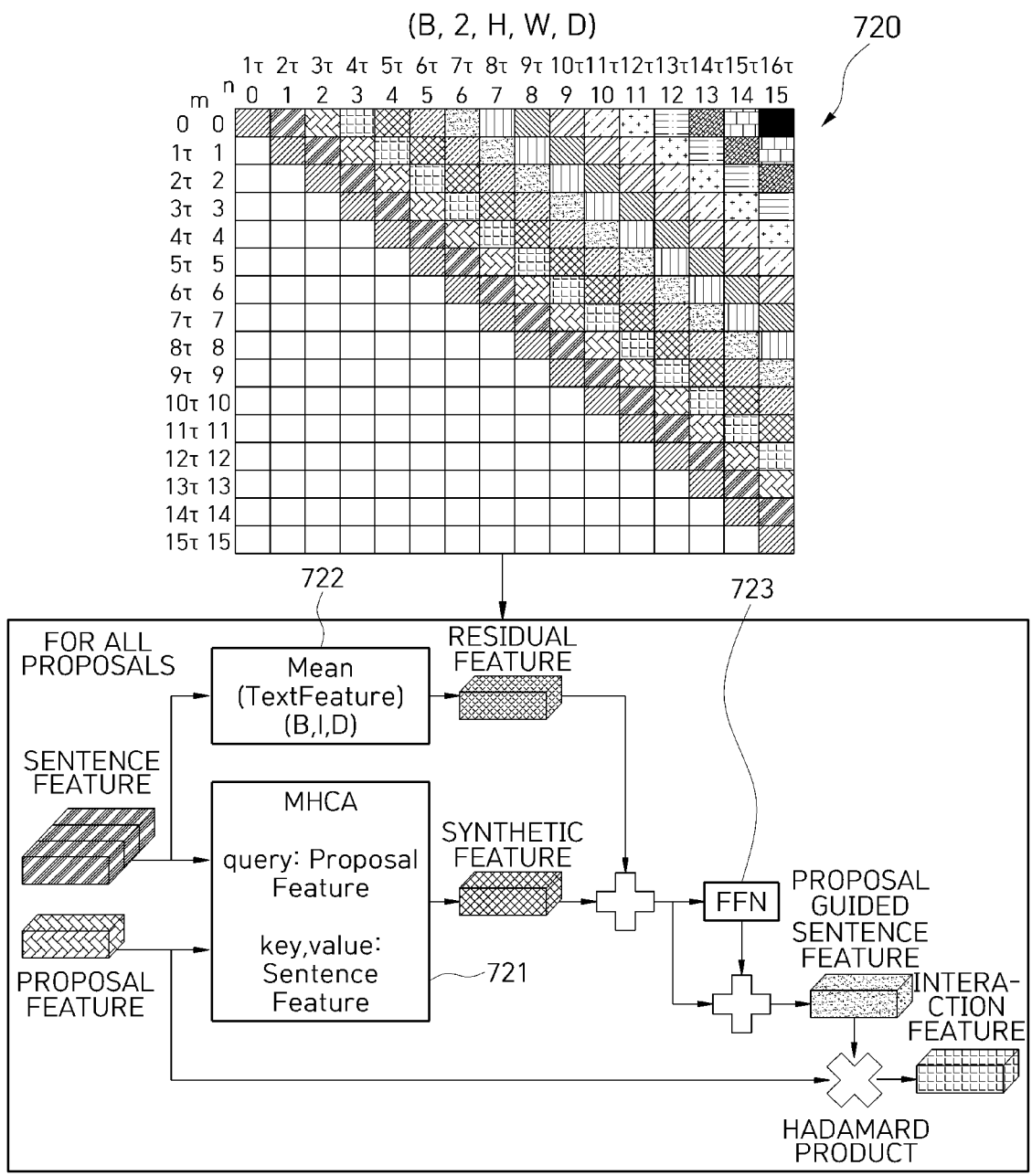

FIGS. 7A to 7C are diagrams for describing the cross-modal proposal feature map extraction unit 513 in an embodiment of the present disclosure.

The cross-modal proposal feature map extraction unit 513 extracts the feature map of the semantic interval proposal having an N×N size. In this case, an (m, n) cell at any one position in the feature map of the semantic interval proposal having the N×N size means a semantic interval proposal having an $[m^*\tau, n^*\tau]$ interval. Accordingly, in the N×N feature map of the semantic interval proposal, interval lengths are identical with each other for each diagonal line, and the interval length includes a total of N scales.

As an embodiment, in order to extract a proposal feature for each scale, the cross-modal proposal feature map extraction unit 513 first performs average pooling 711 and standard deviation pooling 712 in an L/T stride unit in order to change Tv transformed video features into N clips. Thereafter, the cross-modal proposal feature map extraction unit 513 constructs the results of the average pooling and the standard deviation pooling one as feature by concatenating the results of the average pooling and the standard deviation pooling and performing a linear operation 713 on the results. The cross-modal proposal feature map extraction unit 513 may extract a segment clip feature for each scale from the one feature, may set the segment clip feature as a key and a value, may set, as a query, a predetermined query feature which may be learnt, and may generate feature information for each scale by performing a multi-head cross-attention operation 717 on the key and the value.

Furthermore, as an embodiment, in order to generate information on a residual feature, the cross-modal proposal feature map extraction unit 513 performs average pooling and standard deviation pooling 718 on the segment clip feature, concatenates two features of the average pooling and standard deviation pooling, and set the concatenated features as a key and a value. Furthermore, the cross-modal proposal feature map extraction unit 513 may generate the information on the residual feature by setting a predetermined learnable feature as a query and performing a multihead cross-attention operation 719 on the query.

Thereafter, the cross-modal proposal feature map extraction unit 513 sums the feature information for each scale and the information on the residual feature, and inputs the summed results to a feed forward network (FFN) 718. The output of the FFN is added to a previous input value again, so that a feature map for a specific scale is finally generated. The cross-modal proposal feature map extraction unit 513 may generate an N×N feature map of the semantic interval proposal for the transformed video feature by generating a feature map for all scales.

The cross-modal proposal feature map extraction unit 513 may generate another N×N feature map of the semantic interval proposal by performing the aforementioned process on the guided sentence feature in addition to the transformed video feature.

Referring to FIG. 7C, the cross-modal proposal feature map extraction unit 513 sets a proposal feature from a semantic interval proposal feature map 720 as a query, sets a sentence feature as a key and a value, performs a multihead cross-attention operation 721 on the query and the key and value, sums the results of the multi-head cross-attention operation 721 and the sentence feature on which average pooling 722 has been performed, and inputs the results of the sum to an FFN 723.

Thereafter, the cross-modal proposal feature map extraction unit 513 may obtain one proposal guided sentence feature by summing the input and output of the FFN 723 again, and may generate a cross-modal proposal feature map that has interacted with the sentence feature by performing a Hadamard product operation on the one proposal guided sentence feature and the proposal feature.

Figure 8:
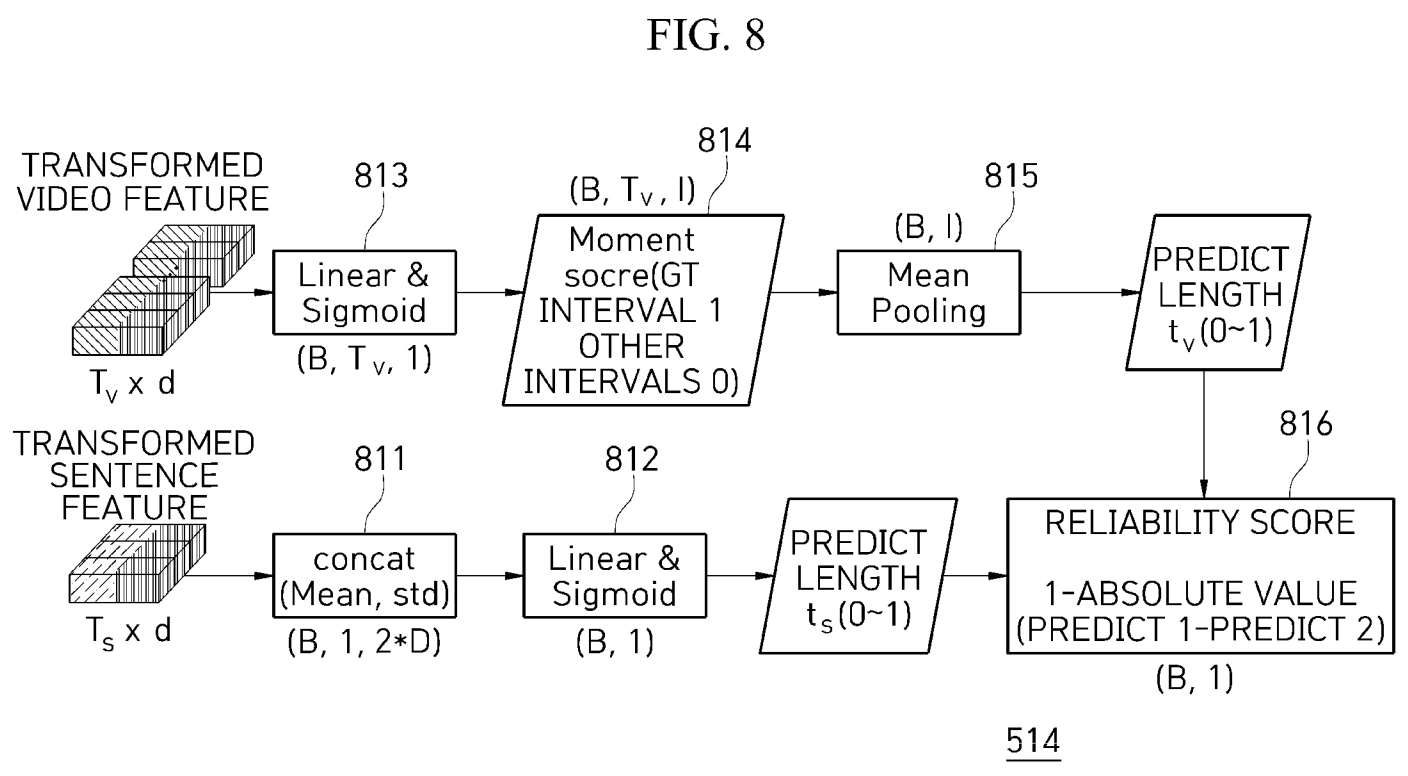

FIG. 8 is a diagram for describing a process of predicting the length of a query sentence in an embodiment of the present disclosure.

As an embodiment, the proposal interval length similarity map extraction unit 514 performs average pooling and standard deviation pooling on the transformed sentence feature and then concatenates the results of the average pooling and standard deviation pooling (811). Furthermore, the proposal interval length similarity map extraction unit 514 generates information on the length of a first query sentence, which has a normalized length $t_s$ between 0 and 1, through a linear and sigmoid operation 812. In this case, the value between 0 and 1 means the ratio of the normalized length to the entire video length.

Furthermore, the proposal interval length similarity map extraction unit 514 performs a linear and sigmoid operation 813 on the transformed video feature, derives a feature corresponding to a ground truth (GT) interval of the query sentence so that the feature becomes 1 and a feature other than the GT interval so that the feature becomes 0 (814), and generates information $t_v$ on the length of a second query sentence, which is predicted by performing mean pooling 815 on the features. In this case, the proposal interval length similarity map extraction unit 514 calculates a reliability score based on the predicted information on the lengths of the first and second query sentences because the predicted length of the GT interval is an uncertain value (816). The reliability is calculated as a value that is obtained by taking an absolute value with respect to a difference value between the predicted information on the length of the first query sentence and the predicted information on the length of the second query sentence and then subtracting 1 from the absolute value. Accordingly, in an embodiment of the present disclosure, the more similar the two predicted values are, the higher the length similarity score that is the reliability of the predicted value is, and the more different the two predicted values are, the lower the length similarity score is.

Figure 9:
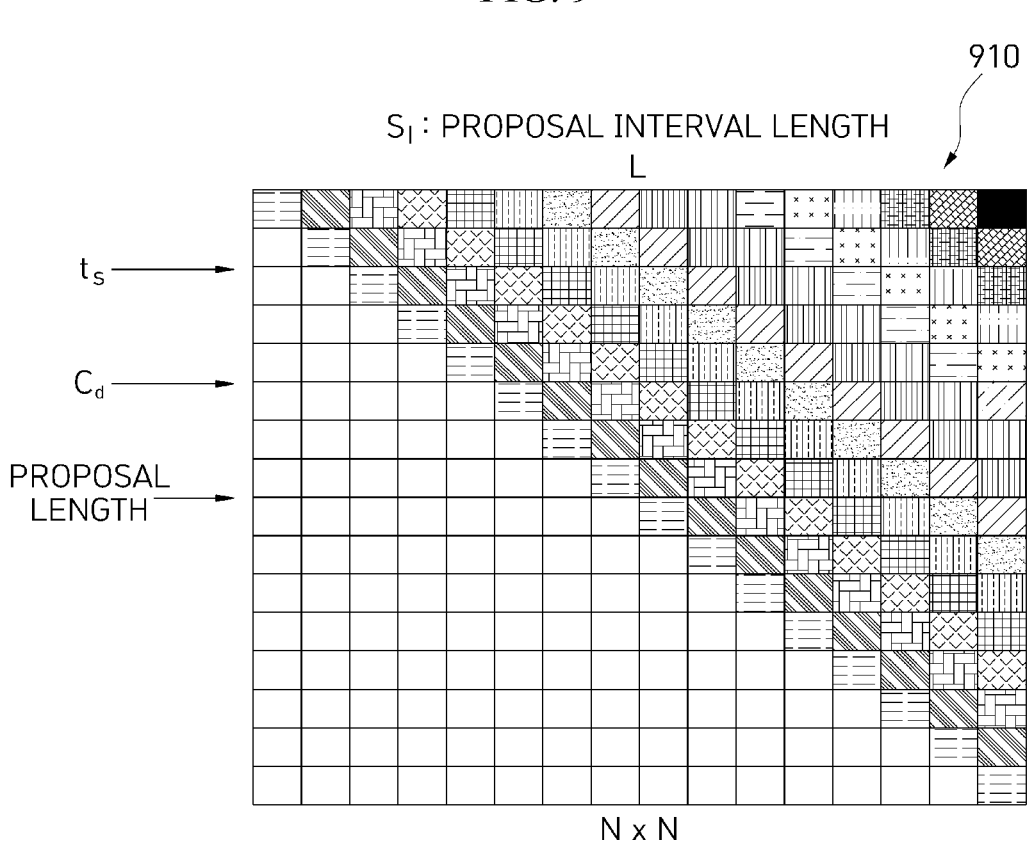
FIG. 9 is a diagram for describing a process of extracting a proposal interval length similarity map in an embodiment of the present disclosure.

FIG. 9 is a diagram for describing a process of extracting a proposal interval length similarity map in an embodiment of the present disclosure.

As an embodiment, the proposal interval length similarity map extraction unit 514 may extract a proposal interval length similarity map 910 based on Equation 3.

$$k^{(-|Proposal\_length-t_s|)} * cd \qquad (3)$$

The proposal interval length similarity map extraction unit 514 predicts length values 0 to 1 of a normalized interval for each proposal interval, and then calculates similarity based on information on the length of the normalized interval, the information $t_s$ on the length of the first query sentence, and the calculated reliability cd. Furthermore, the proposal interval length similarity map extraction unit 514 may extract a proposal interval length similarity map $S_l$ by applying the similarity to all proposal intervals. In this case, in Equation 1, k is a hyper parameter constant greater than 1. In an embodiment of the present disclosure, 4 has been applied as k, for example.

Figure 10:
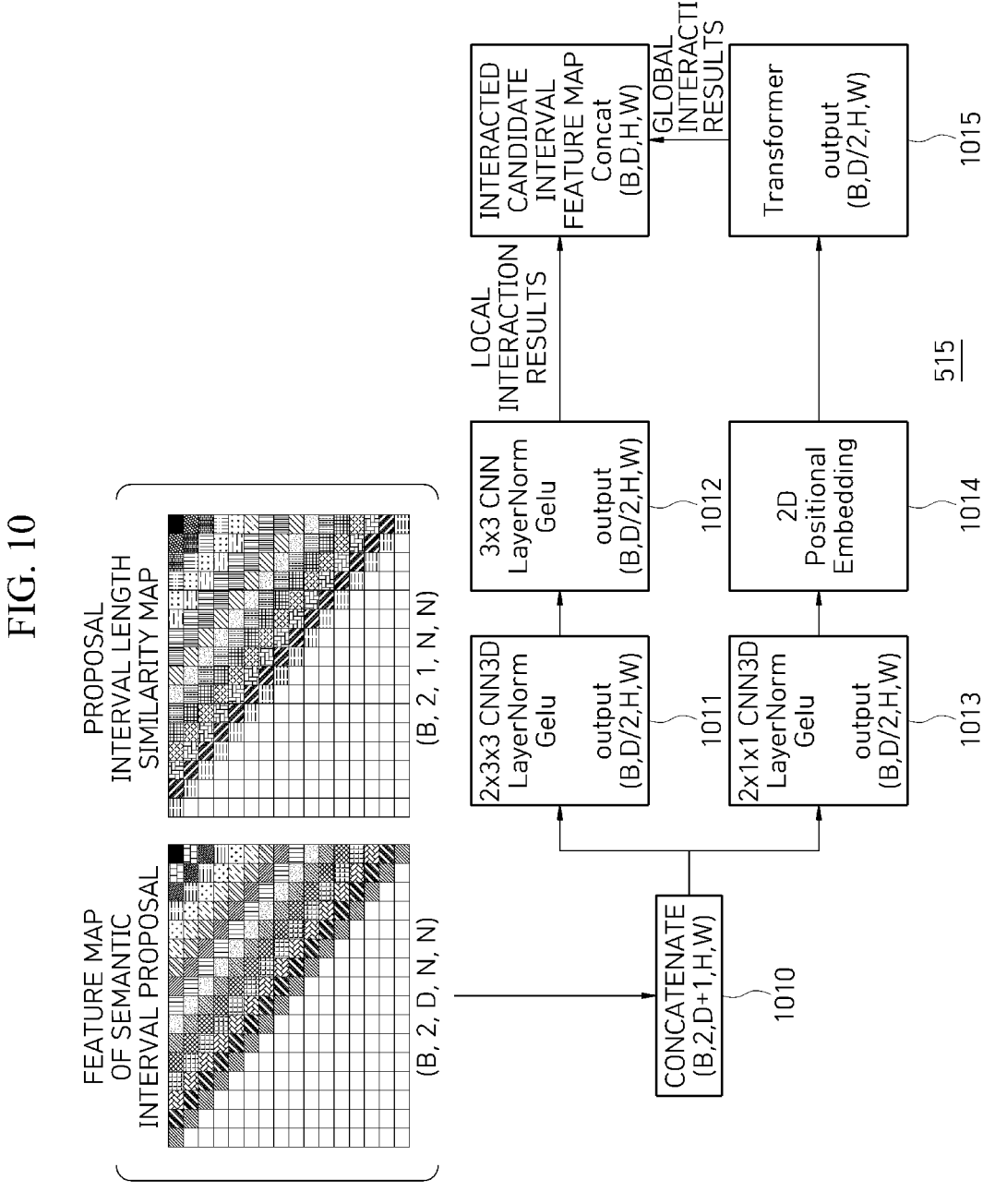
FIG. 10 is a diagram for describing a proposal interaction feature map extraction unit in an embodiment of the present disclosure.

FIG. 10 is a diagram for describing the proposal interaction feature map extraction unit 515 in an embodiment of the present disclosure.

As an embodiment, the proposal interaction feature map extraction unit 515 may perform two branch processes and extract a proposal interaction feature map by integrating the two branch processes again. Specifically, the proposal interaction feature map extraction unit 515 performs an expand operation in order to match the dimensions of the proposal interval length similarity map extracted by the proposal interval length similarity map extraction unit 514 and the feature map of the semantic interval proposal extracted by the cross-modal proposal feature map extraction unit 513. That is, the proposal interaction feature map extraction unit 515 prepares the proposal interval length similarity map and the cross-modal proposal feature map so that the proposal interval length similarity map and the cross-modal proposal feature map can interact with each other and exchange information by matching the sizes of the proposal interval length similarity map and the cross-modal proposal feature map.

Thereafter, the proposal interaction feature map extraction unit 515 concatenates the proposal interval length similarity map and the cross-modal proposal feature map (1010), then generates local interaction results by passing the proposal interval length similarity map and the cross-modal proposal feature map through a plurality of convolution layers 1011 and 1012, and generates global interaction results by passing the proposal interval length similarity map and the cross-modal proposal feature map through at least one convolution layer 1013, 2D positional embedding 1014, and a transformer 1015. Thereafter, the proposal interaction feature map extraction unit 515 may extract a proposal interaction feature map $F_{PI}$ by concatenating the local and global interaction results.

Figure 11:
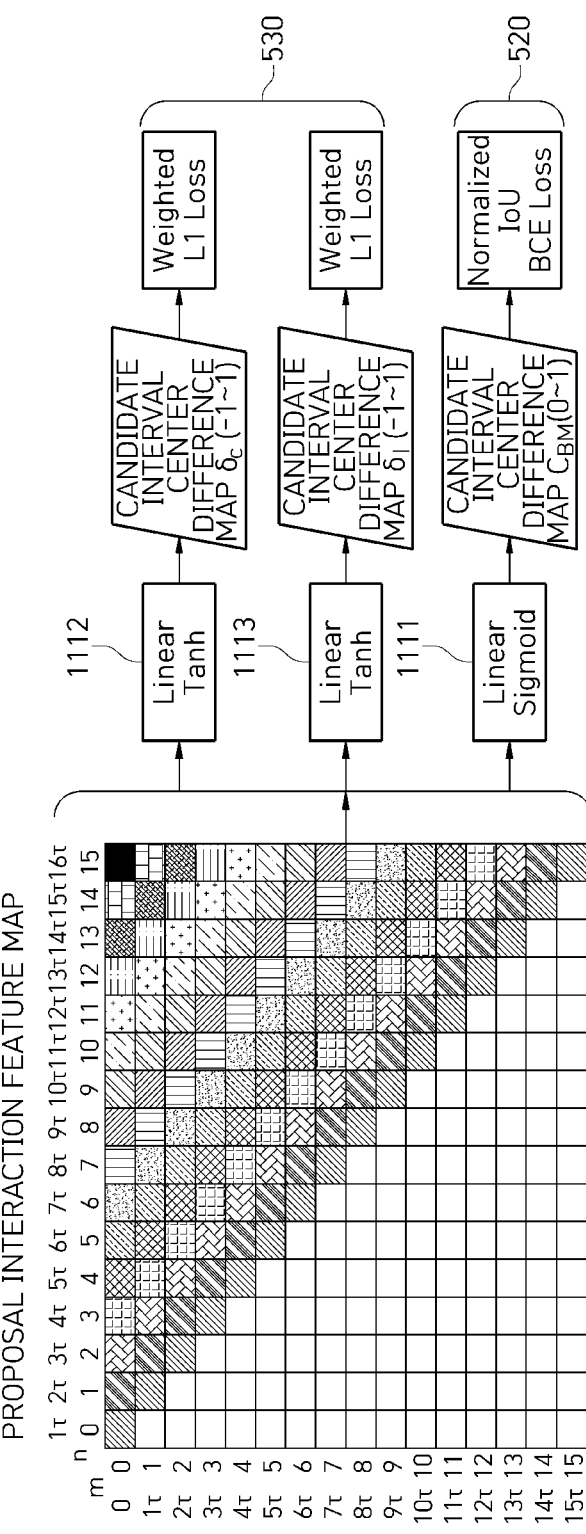
FIG. 11 is a diagram for describing a boundary matching unit and a boundary refinement unit in an embodiment of the present disclosure.

FIG. 11 is a diagram for describing the boundary matching unit 520 and the boundary refinement unit 530 in an embodiment of the present disclosure.

As an embodiment, the boundary matching unit 520 receives the proposal interaction feature map, and generates the candidate interval matching map indicating whether a candidate interval corresponds to a proposal interval. That is, the boundary matching unit 520 may generate the candidate interval matching map which may be said to be an initial proposal score map by performing a linear and sigmoid operation 1111 on the proposal interaction feature map.

Furthermore, the boundary refinement unit 530 generates a boundary refinement map indicative of a center offset and a length offset for the fine adjustment of a semantic interval proposal that is predicted based on the proposal interaction feature map. That is, in order to generate the boundary refinement map, the boundary refinement unit 530 may input the proposal interaction feature map to two layers for a linear operation and tangent operation 1112 and 1113, and may then calculate a center difference map $\delta_C(-1\sim1)$ and a length difference map $\delta_l(-1\sim1)$ between the GT and the semantic interval proposal.

Figure 12:
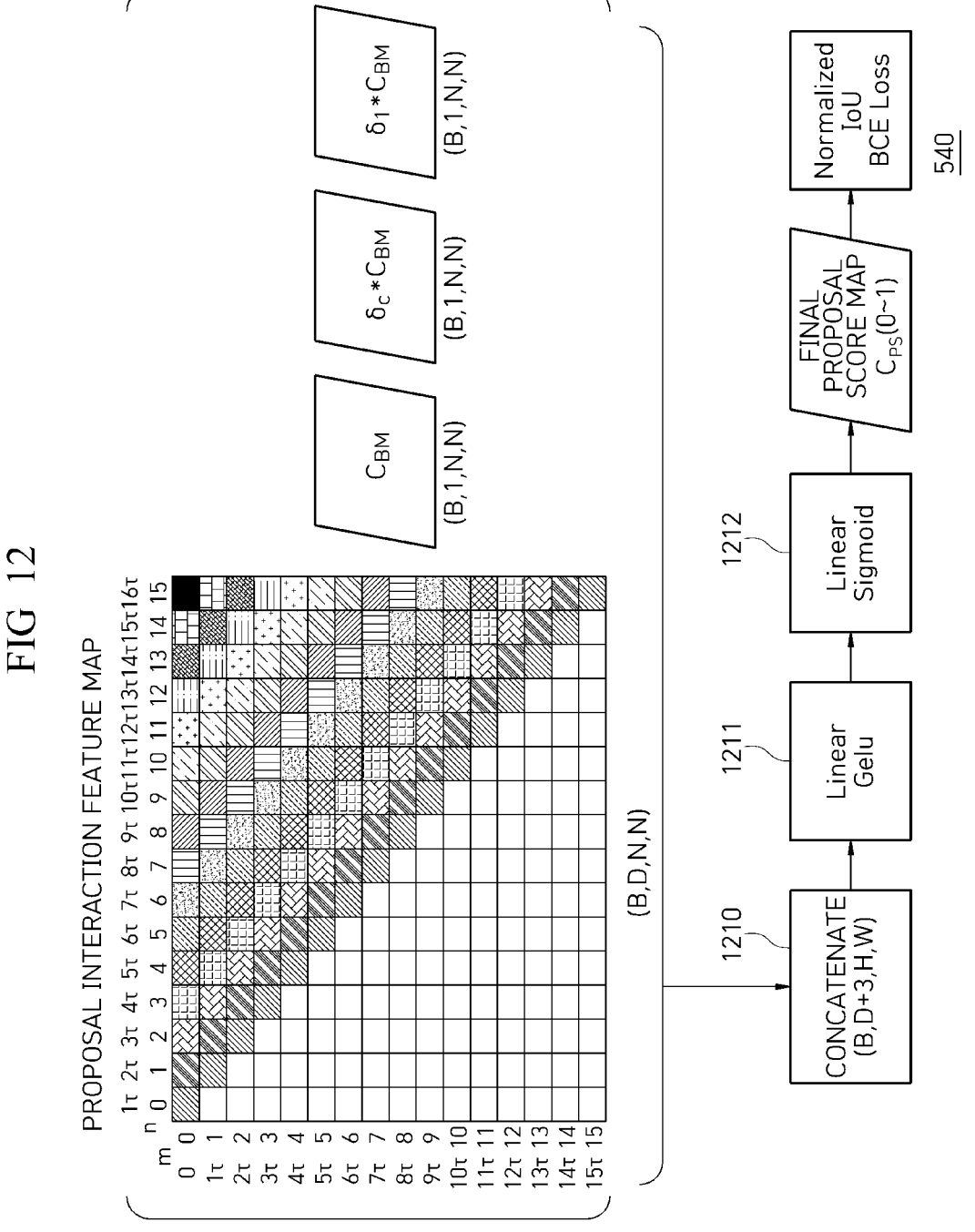
FIG. 12 is a diagram for describing a proposal score map prediction unit in an embodiment of the present disclosure.

FIG. 12 is a diagram for describing the proposal score map prediction unit 540 in an embodiment of the present disclosure.

As an embodiment, the proposal score map prediction unit 540 generates the final proposal score map based on the proposal interaction feature map, the candidate interval matching map, and the boundary refinement maps. Specifically, the proposal score map prediction unit 540 may concatenate (1210) the proposal interaction feature map, the candidate interval matching map, and results obtained by multiplying each of the boundary refinement maps by the candidate interval matching map, and may then generate the final proposal score map through linear operation and sigmoid operations 1211 and 1212.

Hereinafter, loss functions that are applied to an embodiment of the present disclosure in order to train a video semantic interval detection network having the refined variable boundary are described in detail.

As an embodiment, the processor 430 may train the video semantic interval detection network by summing a plurality of loss functions as in Equation 4. In this case, the plurality of loss functions may include a semantic interval score loss function $L_m$, a semantic interval length loss function $L_d$, a proposal score loss function $L_s$, and a proposal refinement loss function $L_r$.

$$L = \lambda_1 \cdot L_m + \lambda_2 \cdot L_d + \lambda_3 \cdot L_s + \lambda_4 \cdot L_r \qquad (4)$$

In Equation 4, k=1, 2, 3, 4, and $\lambda_k$ means a balancing parameter for each loss function.

Specifically, in order to calculate the semantic interval score loss function $L_m$, the processor 430 labels a frame that is included in the GT interval of a query sentence with 1, and labels a frame that is not included in the GT interval with 0. Thereafter, the processor 430 may calculate the semantic interval score loss function $L_m$ through a binary cross entropy loss operation between result values $M_{rv}$ and $M_{gs}$ obtained by performing a linear operation and a sigmoid operation on the labeled values, the transformed video feature, and the guided sentence feature.

$$L_m = L_{m_v} + L_{m_s} \tag{5}$$

$$L_{m_v} = \sum_{i=1}^{T_v} y_m(i)\log(M_{tv}(i)) + (1 - y_m(i))\log(1 - M_{tv}(i))$$

$$L_{ms} = \sum_{i=1}^{T_v} y_m(i)\log(M_{gs}(i)) + (1 - y_m(i))\log(1 - M_{gs}(i))$$

Furthermore, the processor 430 may calculate the semantic interval length loss function $L_d$ by performing a binary cross entropy loss operation on information $t_s$ on the normalized length of the first query sentence and the GT interval length $y_d$ with respect to the transformed sentence feature.

$$L_d = y_d\log(t_s) + (1 - y_d)\log(1 - t_s) \tag{6}$$

Furthermore, in order to calculate the proposal score loss function $L_s$, the processor 430 generates, as label information, normalized overlap information between GT intervals $(\tau_{start}, \tau_{end})$ of the query sentence and each proposal interval $(P(c)=(t_{start}(c), \tau_{end}(c)), 0 \le c \le a$ total number of proposal intervals) of the video. In this case, the value of the overlap information IoU is $o(c)=\text{IoU}(P(c)), (\tau_{start}, \tau_{end})$, and may be normalized as a value between 0 and 1 by dividing the value of the overlap information IoU by the greatest IoU value.

$$\tilde{o} = o(c)/o_{max} \tag{7}$$

In Equation 7, an IoU score $\tilde{o}(c)$ is scaled through an $\text{IoU}_{min}$ value, that is, a hyper parameter, and is used as the value $y_s$ of the label information.

$$y_s(c) = \begin{cases} \tilde{o}(c) - IoU_{min}, & \text{if } \tilde{o}(c) < IoU_{min} \\ 1.0 - IoU_{min}, & \text{if } \tilde{o}(c) < IoU_{min} \\ 0, & \text{otherwise} \end{cases} \tag{8}$$

Thereafter, the processor 430 may calculate a loss function of the candidate interval matching map $C_{BM}$ by applying the variable value of the label information based on a binary cross entropy loss operation. In this case, in an embodiment of the present disclosure, when the loss function of the candidate interval matching map $C_{BM}$ is calculated, the value $y_s$ of the label information is changed because the $\text{IoU}_{min}$ value is s uniformly sampled between 0.5 and 0.9 for each step. Accordingly, reduction of overfitting can be induced as in a dropout or label smoothing, and model performance can be improved.

Furthermore, the processor 430 may calculate the loss function of the final proposal score map $C_{PS}$ by applying a fixed value of the label information according to Equation 8, and may then calculate the proposal score loss function by summing the loss functions.

That is, when the loss function of the final proposal score map $C_{PS}$ is calculated, the $\text{IoU}_{min}$ value is fixed to 0.5. The processor 430 may calculate the proposal score loss function through a binary cross entropy loss operation by applying the fixed $\text{IoU}_{min}$ value.

$$L_s = L_{bm} + L_{ps} \tag{9}$$

$$L_{bm} = \frac{1}{C}\sum_{c=1}^{C} y_{s_{rand}}(c)\log(C_{BM}(c)) + \left(1 - y_{s_{rand}}(c)\right)\log(1 - C_{BM}(c))$$

$$L_{ps} = \frac{1}{c}\sum_{c=0}^{C} y_{s\_0.5}(c)\log(C_{PS}(c)) + (1 - y_{s\_0.5}(c))\log(1 - C_{PS}(c))$$

Next, the processor 430 may calculate the proposal refinement loss function $L_r$, that is, a loss function for the boundary refinement maps.

First, the processor 430 sets normalized overlap information between the GT interval of the query sentence and each proposal interval of the video as first label information $y_{s\_0.5}$.

When a loss of the center offset is calculated, a difference between the central positions of the GT intervals $(\tau_{start}, \tau_{end})$ and the proposal interval $P(c)$ is set as $y_{o\_c}(c)$, that is, a label value. When a loss of the length offset is calculated, a length difference $y_{o\_l}(c)$ between the GT interval and the proposal interval is set as a label value.

$$y_{o\_c}(c) = (\tau_{end} + \tau_{start})/2 - (t_{end} + t_{start})/2 \tag{10}$$

$$y_{o\_l}(c) = (\tau_{end} - \tau_{start}) - (t_{end} - t_{start})$$

The value of the loss may be calculated through an L1 loss. A loss of each of values having the overlap information IoU of 0.5 or more may be obtained by multiplying the value of a loss for each proposal interval by a value $y_{s\_0.5}$, that is, the value of a scaled IoU label when $\text{IoU}_{min}=0.5$.

That is, the processor 430 may set a difference between the central positions of the GT interval of the query sentence and each proposal interval of the video as second label information $y_{o\_c}(c)$, and may calculate the loss function $L_{o\_c}$ of the center offset by applying the fixed value $y_{s\_0.5}$ of the first label information.

Furthermore, the processor 430 may set a difference between the lengths of the GT interval of the query sentence and each proposal interval of the video as third label information $y_{o\_l}(c)$, and may calculate the loss function $L_{o\_l}$ of the length offset by applying the fixed value $y_{s\_0.5}$ of the first label information.

Thereafter, the processor 430 calculates the loss function $L_{rIoU}$ of the overlap information IoU between the query sentence, the GT interval, and the proposal interval $(\tilde{t}_{start}(c), \tilde{t}_{end}(c))$ refined by the boundary refinement map by applying the fixed value $y_{s\_0.5}$ of the first label information.

$$\tilde{t}_{start}(c) = t_{start}(c) + \delta_c(c) - \delta_l(c)/2 \tag{11}$$

$$\tilde{t}_{end}(c) = t_{end}(c) + \delta_c(c) + \delta_l(c)/2$$

$$rIoU(c) = \frac{\min(\tau_{end}, \tilde{t}_{end}(c)) - \max(\tau_{end}, \tilde{t}_{start}(c))}{\max(\tau_{end}, \tilde{t}_{end}(c)) - \min(\tau_{end}, \tilde{t}_{start}(c))}$$

$$L_{rIoU} = \frac{1}{c}\sum_{c=1}^{C} -\log(rIoU(c)) \cdot y_{s\_0.5}(c)$$

In Equation 11, the loss function $L_{rIoU}$ takes $-\log$ with respect to the value rIoU. A loss value of loss function $L_{rIoU}$ converges on 0 as the value rIoU becomes 1, and is increased as the value rIoU becomes 0.

Thereafter, the processor 430 may calculate the proposal refinement loss function $L_r$ by summing the loss functions.

$$L_r = L_{o\_c} + L_{o\_l} + L_{rIoU} \qquad (12)$$

Upon inference using a trained model, the processor refines all proposal intervals by using the boundary refinement map and the final proposal score map, and obtains the final top-K proposals by performing neural non-maximum suppression (NMS) based on a score that is calculated in the final proposal score map.

Hereinafter, a method that is performed by the system 100 for detecting a video semantic interval according to an embodiment of the present disclosure is described with reference to FIG. 13.

Figure 13:
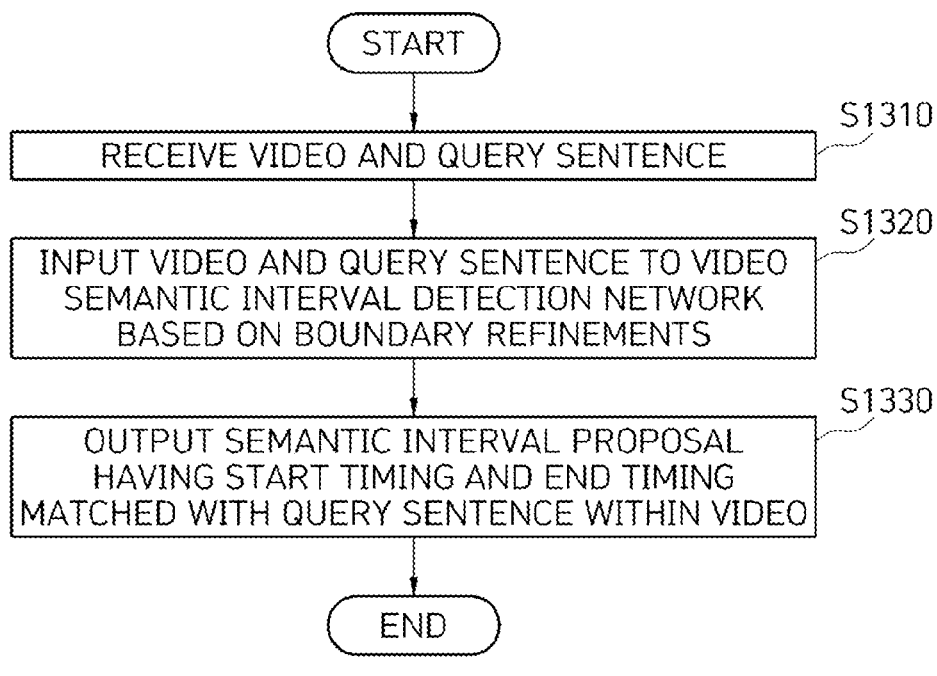
FIG. 13 is a flowchart of a method of detecting a video semantic interval according to an embodiment of the present disclosure.

FIG. 13 is a flowchart of a method of detecting a video semantic interval according to an embodiment of the present disclosure.

First, when a video and a query sentence are received (S1310), the video and the query sentence are input to a pre-trained video semantic interval detection network based on boundary refinements (S1320).

Thereafter, a semantic interval proposal having start timing and end timing, which is matched with the query sentence within the video, is output as the results of the detection of the semantic interval proposal (S1330).

In this case, in an embodiment of the present disclosure, a semantic interval proposal having a variable boundary is output through the refinements of a predetermined semantic interval proposal.

In the aforementioned description, each of steps S1310 to S1330 may be further divided into additional steps or the steps may be combined into smaller steps depending on an implementation example of the present disclosure. Furthermore, some of the steps may be omitted, if necessary, and the sequence of the steps may be changed. Furthermore, although contents are omitted, the contents described with reference to FIGS. 3 to 12 and the contents described with reference to FIG. 13 may be mutually applied.

Hereinafter, the results of the test of performance of the present disclosure are described.

In general, in a current situation in which the length of a video that is produced by photographing is gradually lengthened, a semantic interval is detected in an unedited video, such as a Vlog or a movie having a running time of 1 hour or more. It is practically impossible to use a two-dimensional map that is sufficiently large in the size of available GPU memory. Accordingly, if an embodiment of the present disclosure in which a semantic interval proposal having a variable boundary is output through the refinements of a semantic interval in order to improve accuracy performance of the results of the detection of a video semantic interval with respect to a video having a long length is applied, the embodiment of the present disclosure shows the excellence of high accuracy performance by using limited GPU memory.

The results of a comparison between pieces of performance of the present disclosure and the existing methods with respect to charades-STA and ActivityNet Captions, that is, two representative data sets of a task for the detection of a video semantic interval are illustrated in Tables 1 and 2. In this case, Table 1 illustrates the results of a comparison between pieces of detection performance of a video semantic interval in the data set Charades-STA. Table 2 illustrates the results of a comparison between pieces of detection performance of a video semantic interval in the data set in the data set ActivityNet Captions.

TABLE 1

| Method | Rank1@ | | Rank5@ | |
|---|---|---|---|---|
| | 0.5 | 0.7 | 0.5 | 0.7 |
| C3D video features | | | | |
| CTRL | 23.63 | 8.89 | 58.92 | 29.52 |
| ABLR | 24.36 | 9.01 | — | — |
| DRN | 45.40 | 26.40 | 88.01 | 55.38 |
| LPNet | 40.94 | 21.13 | — | — |
| ACRM | 40.78 | 22.28 | — | — |
| TACI | 36.60 | 18.33 | — | — |
| MS-2D-TAN | 41.10 | 23.25 | 81.53 | 48.55 |
| Our BMRN | 45.93 | 28.37 | 89.12 | 57.19 |
| I3D video features | | | | |
| TMLGA | 33.04 | 19.26 | — | — |
| LGI | 59.46 | 35.48 | — | — |
| DRN | 53.09 | 31.75 | 89.06 | 60.05 |
| CPN | 59.77 | 36.67 | — | — |
| LPNet | 54.33 | 34.03 | — | — |
| ACRM | 57.53 | 38.33 | — | — |
| DTG | 60.19 | 39.38 | 87.53 | 66.91 |
| HiSA | 61.10 | 39.70 | — | — |
| TACI | 60.27 | 38.74 | — | — |
| MS-2D-TAN | 60.08 | 37.39 | 89.06 | 59.17 |
| Our BMRN | 63.09 | 42.46 | 92.62 | 67.65 |

TABLE 2

| Method | Rank1@ | | Rank5@ | |
|---|---|---|---|---|
| | 0.5 | 0.7 | 0.5 | 0.7 |
| C3D video features | | | | |
| CTRL | 29.01 | 10.34 | 59.17 | 37.54 |
| MCN | 21.36 | 6.43 | 53.23 | 29.70 |
| ABLR | 36.79 | — | — | — |
| CMIN | 43.40 | 23.88 | 67.95 | 50.73 |
| 2D-TAN | 44.51 | 26.54 | 77.13 | 61.96 |
| LGI | 41.51 | 23.07 | — | — |
| DRN | 45.45 | 24.36 | 77.97 | 50.30 |
| CPN | 45.10 | 28.10 | — | — |
| MSA | 48.02 | 31.78 | 78.02 | 63.18 |
| LPNet | 45.92 | 25.39 | — | — |
| HiSA | 45.36 | 27.68 | — | — |
| TACI | 45.50 | 27.23 | — | — |
| MS-2D-TAN | 46.16 | 29.21 | 78.80 | 60.85 |
| STCM-Net | 46.23 | 29.04 | 78.43 | 63.46 |
| Our BMRN | 48.47 | 31.15 | 81.37 | 64.44 |

Furthermore, Table 3 illustrates, as quantitative results, an effect of boundary matching and refinements and an effect of a length recognition type proposal map by comparing pieces of performance of a full network, a network from which modules related to boundary matching and a refinement map have been removed, and a network from which a module related to a length similarity map has been removed in the data set Charades-STA.

TABLE 3

| Method | Rank1@ | | Rank5@ | |
|---|---|---|---|---|
| | 0.5 | 0.7 | 0.5 | 0.7 |
| Full BMRN | 63.09 | 42.46 | 92.62 | 67.65 |
| w/o BM and BR maps | 60.83 | 40.54 | 89.95 | 67.89 |
| | (−2.26) | (−1.92) | (−2.67) | (0.24) |

TABLE 3-continued

| Method | Rank1@ | | Rank5@ | |
|---|---|---|---|---|
| | 0.5 | 0.7 | 0.5 | 0.7 |
| w/o Len Sim map | 62.23 (−0.86) | 42.19 (−0.27) | 90.54 (−2.08) | 65.54 (−2.11) |

FIG. 14 is a diagram for describing qualitative analysis results of the method of detecting a video semantic interval based on boundary refinements.

FIG. 14 illustrates the qualitative analysis results of the results of the execution of the data sets Charade-STA and ActivityNet Caption. The existing fixed boundary method shows that accurate detection results are obtained compared to a 2D-TAN method. In particular, when the results of the execution of the data sets into which refinements have been incorporated and the results of the execution of the data sets into which refinements have not been incorporated are compared, it can be seen that the existing fixed boundary method shows higher accuracy than the 2D-TAN method although the refinements are not incorporated. It can be seen that if the refinements are incorporated, the boundary of an interval becomes accurate because the boundary becomes closer to a GT in addition to the higher accuracy.

Furthermore, boundary matching and refinement methods, that is, the core of the present disclosure, are methods applied to a video semantic interval detection technology based on a two-dimensional map. Performance of the boundary matching and refinement methods improved by being applied to the existing 2D-TAN method are illustrated in Table 4.

TABLE 4

| Charades-STA Model | R1@0.5 | R1@0.7 | R5@0.5 | R5@0.7 |
|---|---|---|---|---|
| 2D-TAN | 40.08 | 23.25 | 83.39 | 49.52 |
| 2D-TAN + Refinement Loss No Normal | 42.34 | 24.19 | 85.99 | 50.59 |
| 2D-TAN Refinement Loss With Normal | 45.11 | 25.67 | 86.59 | 50.78 |

The aforementioned embodiment of the present disclosure may be implemented in the form of a program (or application) in order to be executed by being combined with a computer, that is, hardware, and may be stored in a medium.

The aforementioned program may include a code coded in a computer language, such as C, C++, JAVA, Ruby, or a machine language which is readable by a processor (CPU) Of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and is readable by a device, not a medium storing data for a short moment like a register, cache, or a memory. Specifically, examples of the stored medium include ROM, RAM, CD-ROM, a magnetic tape, a floppy disk, optical data but storage, etc., the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A system for detecting a video semantic interval, comprising:
   a communication module configured to receive a video and a query sentence;
   memory in which a program for outputting a semantic interval proposal from the video and the query sentence is stored; and
   a processor configured to execute the program stored in the memory,
   wherein by executing the program, the processor outputs a semantic interval proposal having start timing and end timing, which is matched with the query sentence within the video over a pre-trained video semantic interval detection network based on boundary refinements as results of a detection of the semantic interval proposal, and outputs a semantic interval proposal having a variable boundary through refinements of a predetermined semantic interval proposal, and
   wherein the processor operates a proposal feature extraction unit comprising:
   a unimodal feature encoding unit configured to extract unimodal features from the received video and query sentence, respectively;
   a multimodal feature encoding unit configured to extract a multimodal feature in which the features of the received video and query sentence interact with each other;

a cross-modal proposal feature map extraction unit configured to extract a feature map of the semantic interval proposal based on the unimodal features and the multimodal feature;

a proposal interval length similarity map extraction unit configured to extract a proposal interval length similarity map based on the multimodal feature; and a proposal interaction feature map extraction unit configured to concatenate the feature map of the semantic interval proposal and the proposal interval length similarity map and to extract a proposal interaction feature map through an interaction between a plurality of the semantic interval proposals.

2. The system of claim 1, wherein:

the unimodal feature encoding unit extracts a video feature by inputting the video to a pre-trained video feature extractor and extracts a sentence feature by inputting the query sentence to a pre-trained bidirectional encoder representations from transformer (BERT) model, and the multimodal feature encoding unit generates a transformed video feature and a transformed sentence feature through a multi-head self-attention operation by adding positional embedding information to the video feature and concatenating the video feature and the sentence feature, and generates a guided sentence feature as the video feature by setting the video feature as a query, setting the sentence feature as a key and a value, and performing a multi-head cross-attention operation on the query and the key and value.

3. The system of claim 2, wherein the cross-modal proposal feature map extraction unit generates feature information for each scale by performing a pooling process on the transformed video feature and the guided sentence feature, then extracting N segment clip features for each scale on the feature map of the semantic interval proposal, setting the N segment clip features as the key and value, setting a predetermined learnable query feature as the query, and performing a multi-head cross-attention operation on the key and value and the query, generates information on a residual feature by performing a pooling process on a segment clip feature, then setting the segment clip feature as a key and a value, setting a predetermined learnable query feature as a query, and performing a multi-head cross-attention operation on the key and value and the query, and generates a feature map for a specific scale by summing the feature information for each scale and the information on the residual feature and inputting results of summed results to a feed forward network (FFN), and generates the feature map of the semantic interval proposal for each of the transformed video feature and the guided sentence feature by generating a feature map for all scales.

4. The system of claim 3, wherein the cross-modal proposal feature map extraction unit sets a proposal feature from the feature map of the semantic interval proposal as the query, sets the sentence feature as the key and value, performs the multi-head cross-attention operation on the query and the key and value, sums results of the multi-head cross-attention operation and the sentence feature on which average pooling has been performed, and inputs summed results to the FFN, and generates a proposal guided sentence feature by summing an input and output of the FFN again and generates the cross-modal proposal feature map that has interacted with the sentence feature based on the proposal guided sentence feature and the proposal feature.

5. The system of claim 2, wherein the proposal interval length similarity map extraction unit generates information ($t_s$) on a normalized length of a first query sentence with respect to the transformed sentence feature, generates information ($t_v$) on a length of a second query sentence predicted based on a ground truth of the query sentence with respect to the transformed video feature, and then calculates reliability based on the information on the lengths of the first and second query sentences.

6. The system of claim 5, wherein the proposal interval length similarity map extraction unit generates information on a length of a normalized interval that is predicted for each proposal interval, and extracts the proposal interval length similarity map by applying similarity that is calculated based on the information on the length of the normalized interval, the information on the length of the first query sentence, and the reliability to all proposal intervals.

7. The system of claim 1, wherein:

the proposal interaction feature map extraction unit comprises a plurality of convolution layers, and generates local interaction results between the feature map of the semantic interval proposal and the proposal interval length similarity map, the proposal interaction feature map extraction unit comprises a convolution layer and a transformer and generates global interaction results between the feature map of the semantic interval proposal and the proposal interval length similarity map, and the proposal interaction feature map extraction unit extracts the proposal interaction feature map by concatenating the local and global interaction results.

8. The system of claim 2, wherein the processor operates a boundary matching unit configured to generate a candidate interval matching map based on the proposal interaction feature map, a boundary refinement unit configured to generate boundary refinement maps indicative of a center offset and a length offset, respectively, for fine adjustment of a semantic interval proposal predicted based on the proposal interaction feature map, and a proposal score map prediction unit configured to generate a final proposal score map based on the proposal interaction feature map, the candidate interval matching map, and the boundary refinement map.

9. The system of claim 8, wherein:

the processor trains the video semantic interval detection network by summing a plurality of loss functions, and the plurality of loss functions comprises a semantic interval score loss function, a semantic interval length loss function, a proposal score loss function, and a proposal refinement loss function.

10. The system of claim 9, wherein the processor labels a frame included in a ground truth interval of the query sentence with 1, labels a frame not included in the ground truth interval with 0, and calculates the semantic interval score loss function through a binary cross entropy loss operation between result values obtained by performing a linear operation and sigmoid operation on the frames labeled with 1 or 0, the transformed video feature, and the guided sentence feature.

11. The system of claim 9, wherein the processor calculates the semantic interval length loss function by performing a binary cross entropy loss operation on information on a normalized length of a first query sentence and information on a length of the ground truth interval of the query sentence with respect to the transformed sentence feature.

12. The system of claim 9, wherein the processor
generates normalized overlap information between the ground truth interval of the query sentence and each proposal interval of the video as label information,
calculates a loss function of the candidate interval matching map by applying a variable value of the label information based on a binary cross entropy loss operation,
calculates a loss function of the final proposal score map by applying a fixed value of the label information, and
then calculates the proposal score loss function by summing the loss functions of the candidate interval matching map and the final proposal score map.

13. The system of claim 9, wherein the processor
sets normalized overlap information between the ground truth interval of the query sentence and each proposal interval of the video as first label information,
sets a difference between central positions of the ground truth interval of the query sentence and each proposal interval of the video as second label information and calculates a loss function of the center offset by applying a fixed value of the first label information,
sets a difference between lengths of the ground truth interval of the query sentence and each proposal interval of the video as third label information and calculates a loss function of the length offset by applying the fixed value of the first label information,
calculates a loss function of overlap information between the ground truth interval of the query sentence and a proposal interval refined by the boundary refinement map by applying the fixed value of the first label information, and
then calculates the proposal refinement loss function by summing the loss functions of the center offset, the length offset, and the overlap information.

14. The system of claim 8, wherein the processor
searches for K semantic interval proposals each having a higher proposal score and not overlapping a preset threshold interval or more based on the final proposal score map, and
outputs a semantic interval proposal that is most matched with the query sentence, among the K semantic interval proposals.

15. A method performed by a computer, comprising:
receiving a video and a query sentence;
inputting the video and the query sentence to a pre-trained video semantic interval detection network based on boundary refinements; and
outputting a semantic interval proposal having start timing and end timing, which is matched with the query sentence within the video, as results of a detection of the semantic interval proposal,
wherein the inputting comprises:
extracting unimodal features from the video and query sentence, respectively, using a unimodal feature encoding unit;
extracting a multimodal feature in which features of the video and query sentence interact with each other, using a multimodal feature encoding unit;
extracting a feature map of the semantic interval proposal based on the unimodal features and the multimodal feature, using a cross-modal proposal feature map extraction unit;
extracting a proposal interval length similarity map based on the multimodal feature, using a proposal interval length similarity map extraction unit; and
concatenating the feature map of the semantic interval proposal and the proposal interval length similarity map and extracting a proposal interaction feature map through an interaction between a plurality of the semantic interval proposals, using a proposal interaction feature map extraction unit; and
wherein the outputting of the semantic interval proposal as the results of the detection comprises outputting a semantic interval proposal having a variable boundary through refinements of a predetermined semantic interval proposal.

* * * * *